Patented May 19, 1953

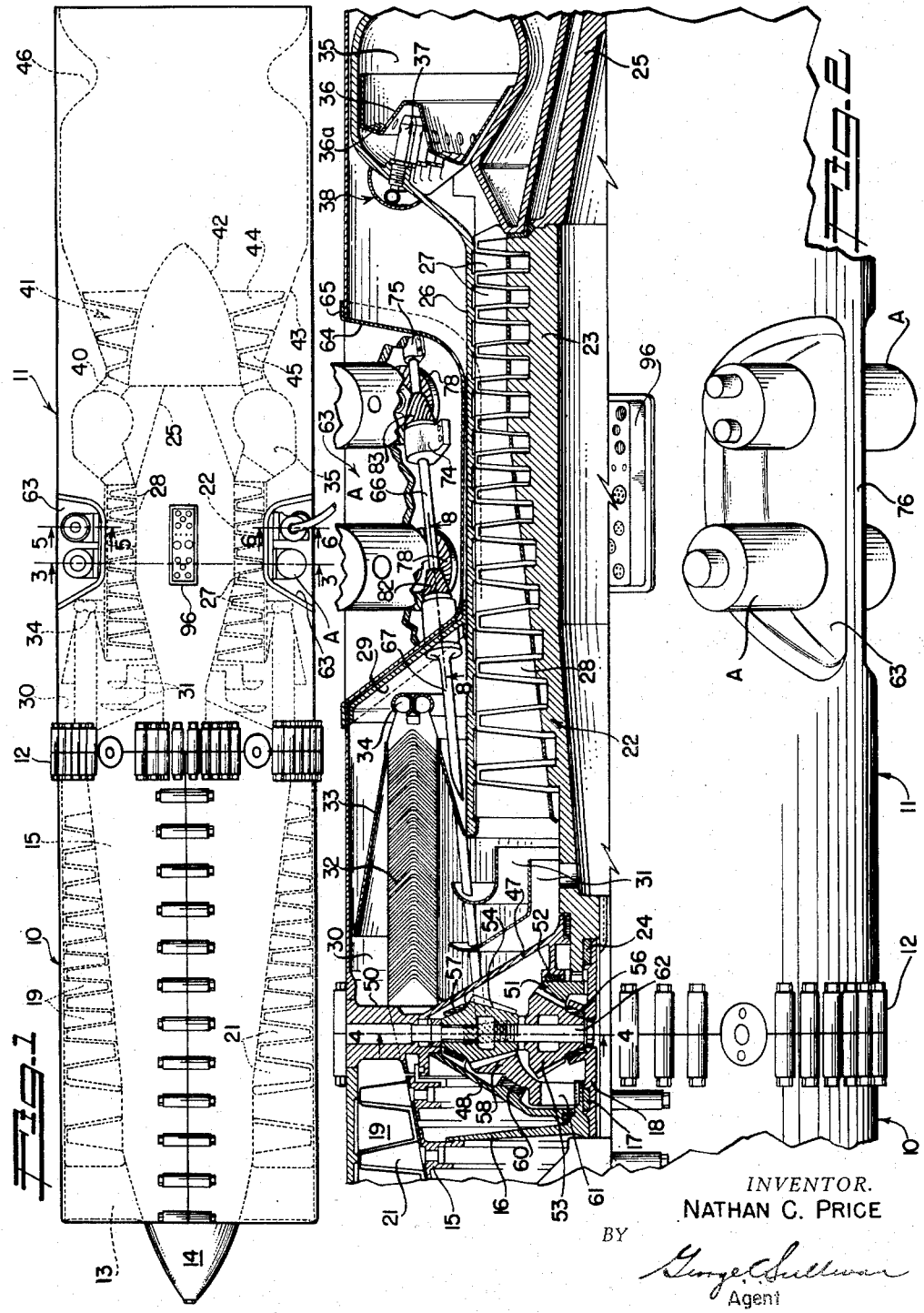

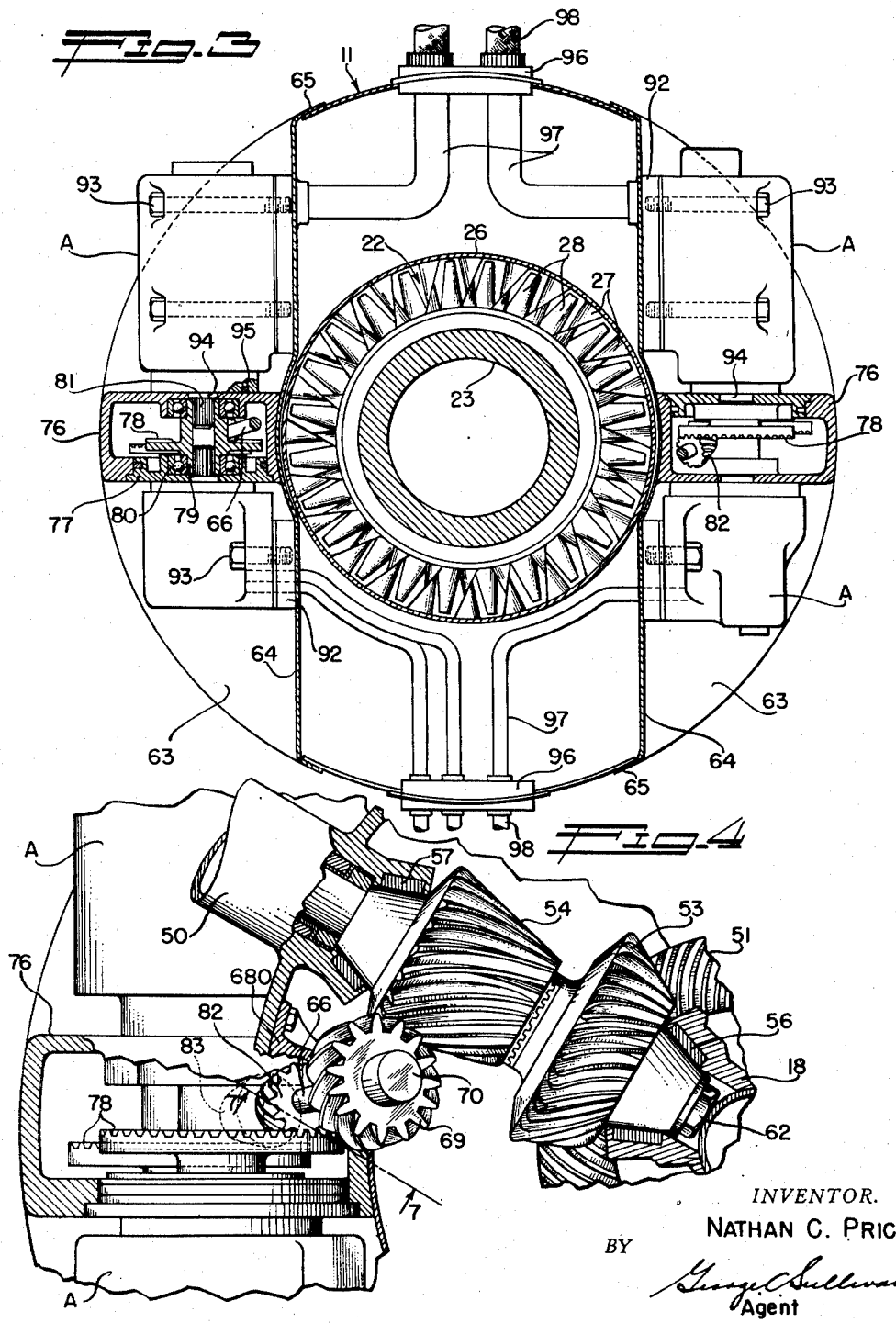

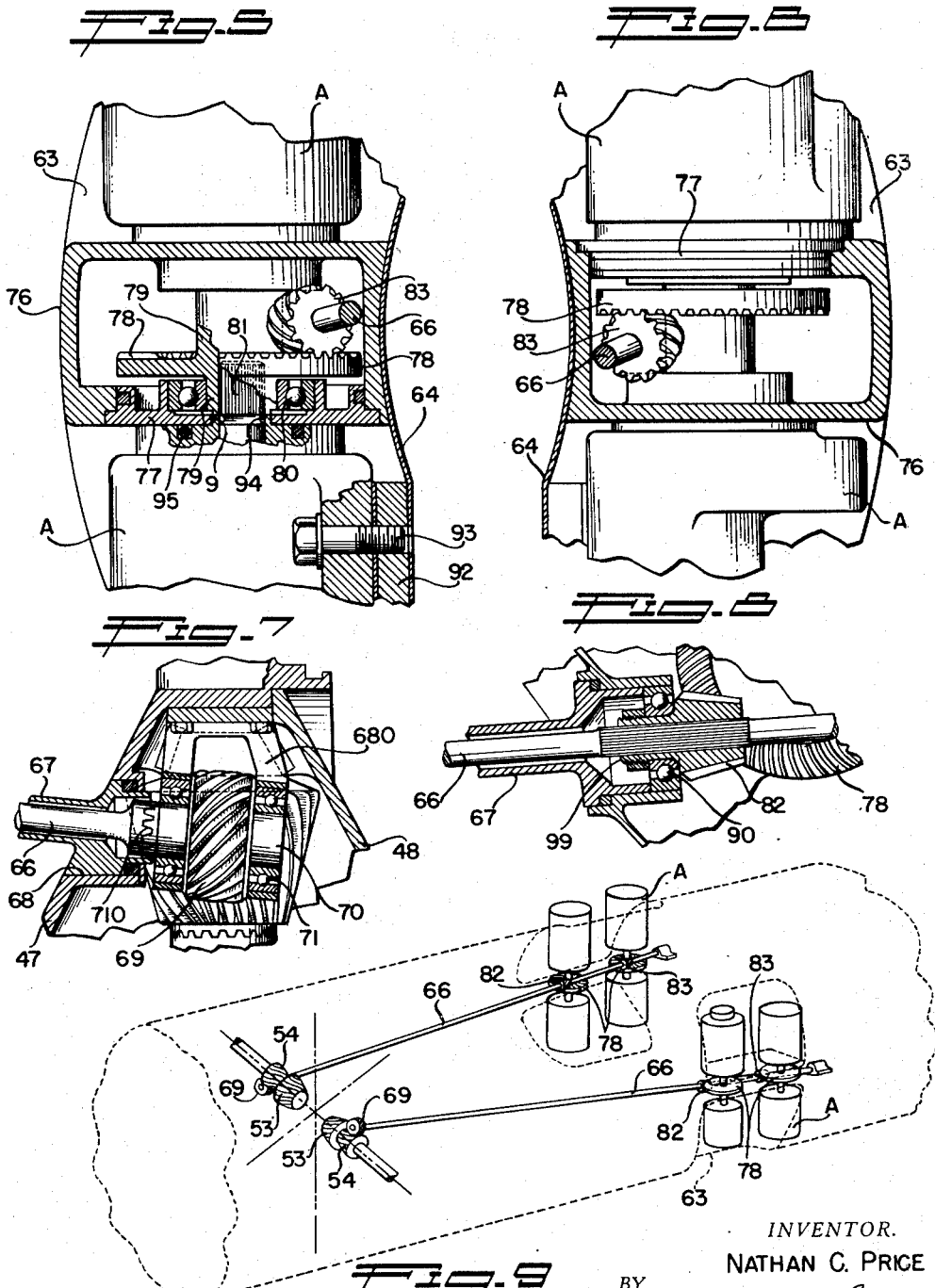

2,638,744

UNITED STATES PATENT OFFICE 2,638,744

TURBINE POWER PLANT HAVING AUXILIARY UNITS

Nathan C. Price, St. Helena, Calif., assignor to Lockheed Aircraft Corporation, Burbank, Calif.

Application December 9, 1948, Serial No. 64,377

6 Claims. (Cl. 60—39.33)

This invention relates to power plants and relates more particularly to aircraft engines of the internal combustion turbine type. It is a general object of this invention to provide a power plant of this class characterized by a particularly advantageous compact arrangement of auxiliaries and accessories and by especially effective means for driving or operating the auxiliaries and accessories, contributing to safety.

In turbine type power plants for the propulsion of aircraft, the locating of the fuel pumps, coolant pumps, electrical generators, and the like, to the best advantage and the driving of these devices have presented difficult problems. In the case of certain power plants of this class, such auxiliaries and accessories have been mounted or arranged at the exterior of the casing, which, of course, complicates the installing of the engine in the airplane and materially increases the overall diameter of the engine assembly. In order to avoid these difficulties, it has been proposed to arrange the auxiliaries within central islands or cases in the forward air inlet portion of the compressor system. Although this latter arrangement avoids the necessity for increasing the overall outside diameter of the power plant it places the auxiliaries in locations where they are difficult of access and where they are remote from the related elements of the power plant so that it becomes necessary to employ long pipe lines, electrical circuits, etc., leading to and from the auxiliaries. Furthermore, the location of auxiliaries in the inlet of a machine of the axial flow type tends to obstruct the airflow, particularly in supersonic induction inlets, and also the failure of an auxiliary may result in broken parts entering the compressor blading, destroying the whole engine. The breakage of a hydraulic (oil) pump line at the inlet of a nose-mounted pump can cause a gas turbine to "run away" without the emergency speed governor being able to overcome this condition.

It is the object of this invention to provide a power plant of the class referred to characterized by auxiliaries and accessories arranged in advantageous positions substantially midway between the ends of the engine where they are adjacent to their related elements of the engine and where they do not increase the outside diameter of the engine to any appreciable extent. It is also an object to place the auxiliaries where they can not result in damage to the rest of the machine, in the event of failure of one of these auxiliaries. The power plant has an elongate casing of generally cylindrical configuration containing first and second stage axial flow compressors. The second stage compressor, which is approximately midway in between the ends of the engine, is considerably smaller in diameter than the first stage compressor and the housing, thereby leaving an area or space for receiving the auxiliaries. The auxiliaries are, in practice, contained in pockets in the intermediate zone of the casing to be primarily within the outside dimensions of the casing and to be adjacent to the related elements of the engine. For example, the fuel pumps arranged in the pockets are relatively close to the fuel injecting nozzles and the coolant pump is near the heat exchanger so that only short conduits are required. The outer sides of the pockets may be open so that the auxiliaries are freely accessible for inspection, servicing and replacement.

Another object of the invention is to provide a power plant of the character referred to embodying effective substantially universal drives for the auxiliaries. The invention includes power take-off shafts driven from the gearing which constitutes the drive between the first and second stage axial flow compressors. These take-off shafts extend rearwardly through the engine housing to the pockets to drive the auxiliaries. Two or more appropriate speed reduction gear sets may be provided for driving between each of these shafts and the auxiliaries. The auxiliary driving shafts are arranged to pass rearwardly through the intermediate portion of the engine without interfering with other elements and are preferably driven at high speed from the cluster pinions of the compressor drive or transmission. The two auxiliary drive shafts extending to the two pockets in the casing also permit the installation of duplicate auxiliary and accessory sets where "regular" and "stand-by" auxiliaries are desired.

It is a further object of the invention to provide a power plant arrangement of the character described wherein the provision of the auxiliary containing pockets and the auxiliary drive shafts does not complicate the engine as a whole, or in any way interfere with the normal operation of the engine components.

Other features and objectives will become apparent from the following detailed description of the typical preferred form of the invention, illustrated in the accompanying drawings, wherein:

Figure 1 is a side elevation of the power plant of this invention with the major internal elements appearing in broken lines;

Figure 2 is an enlarged fragmentary view of the intermediate portion of the power plant with the upper part appearing in vertical cross section;

Figure 3 is an enlarged transverse detailed sectional view taken as indicated by line 3—3 on Figure 1;

Figure 4 is an enlarged fragmentary sectional view of the power take-off gearing being a view taken substantially as indicated by line 4—4 on Figure 2;

Figure 5 is an enlarged fragmentary transverse sectional view taken substantially as indicated by line 5—5 on Figure 1 with certain parts broken away to appear in elevation;

Figure 6 is an enlarged fragmentary transverse sectional view taken substantially as indicated by line 6—6 on Figure 1 with the gears appearing in side elevation;

Figure 7 is a fragmentary sectional view of the take-off gearing, being a view taken substantially as indicated by line 7—7 on Figure 4;

Figure 8 is an enlarged fragmentary sectional view taken substantially as indicated by line 8—8 on Figure 2; and Figure 9 is a diagrammatic perspective view of power take-off gearing for driving the auxiliaries with the power plant casing appearing in broken lines.

The power plant illustrated in the drawings and incorporating the features of the invention includes an elongate generally cylindrical casing having a forward section 10 and a rear or major section 11 connected together in end to end relation at a bolted joint 12. The forward end of the casing section 10 is in the nature of an inlet for the ram air and has radial vanes 13 for directing the inflow, which vanes carry a central spider or fairing 14.

The first stage axial flow compressor is contained in the forward housing section 10 and includes a rotor 15, rotatably supported in coaxial position within the casing section. The forward end of the rotor 15 is suitably supported in the spider 14 while the rear end of the rotor has a plate 16, journaled at 17 on a stationary centrally arranged tubular member 18. A multiplicity of rows of stator blades 19 project inwardly from the wall of the casing section 10, and rows of impeller blades 21 project from the rotor 15 to operate between the rows of stator blades.

The second stage compressor 22 is housed in the forward portion of the casing section 11 and includes a central longitudinally extending rotor 23. The forward end of the rotor 23 is rotatably supported on the stationary member 18 by a bearing 24 while the rear end of the rotor is fixed to a turbine shaft 25. A tubular housing 26 surrounds the rotor 23 and carries a plurality of rows of spaced stator blades 27. It will be observed in Figures 1, 2 and 3 that the compressor housing 26 is substantially cylindrical and is considerably smaller in diameter than the main casing sections 10 and 11 by virtue of its induction air having been compressed and cooled. The rotor 23 of the second stage compressor carries rows of outwardly projecting blades 28 which stand between the rows of stator blades 27. The rear or major casing section 11 is a tubular assembly extending rearwardly from the bolted connection 12 and serves to enclose or surround the housing 26 of the axial flow second stage compressor 22. A web or plate 29 extends inwardly from the casing section 11 to the compressor housing 26 to support or to assist in supporting the latter. The forward end of the compressor housing 26 is spaced rearwardly from the bolted connection 12 between the casing sections 10 and 11 leaving an internal passage 30 within the main engine casing for conducting compressed air from the discharge end of the first stage compressor to the inlet end of the second stage compressor 22. The supporting plate 29 described above may close off the rear portion of the passage 30 around the compressor housing 27 and direction changing vanes or guides 31 within the passage direct the compressed air into the second stage compressor 22.

The power plant further includes a heat exchanger 32 arranged in the path of the compressed air flowing through the passage 30. The heat exchanger 32 is preferably annular in shape and is arranged in co-axial relation to the compressor housing 26, there being baffle or guide plates 33 to direct the rearwardly flowing air substantially radially inward through the heat exchanger. In this way all of the compressed air leaving the first stage compressor is obliged to flow through the heat exchanger 32 where it gives up a substantial portion of its heat of compression prior to entering the second stage compressor 22. The heat exchanger 32 has a dual manifold 34 at its rear end for distributing a coolant liquid through the internal passages of the heat exchanger and for receiving the liquid medium for delivery to a radiator or heat rejection means not shown. The particular heat exchanger illustrated is of the type described in my co-pending application Serial No. 721,782, filed January 13, 1947, now Patent No. 2,575,683.

A combustion chamber 35 is arranged in the casing section 11 at the rear of the second stage compressor 22 and receives the compressed air from the outlet of the compressor. The combustion chamber 35 is a hollow annular structure secured to or connected with the rear end of the compressor housing 26 and its outside diameter is considerably larger than that of the compressor housing 26, having its wall adjacent to the shell of the casing section 11. Internal shrouds 36 are arranged in the forward portion of the chamber 35 and fuel injecting nozzles 37 extend rearwardly between the shrouds. Air inlet swirl vanes 36ª are formed in the forward portions of the shrouds 36 to admit the compressed air from the compressor system to the main combustion space. Air and fuel manifolds 38 supply air and fuel under pressure to the nozzles 37 and the shrouds 36 are apertured to allow the air and fuel to discharge into the main combustion space. The rear end of the combustion chamber 35 has an annular nozzle 40 for discharging the hot combustion gases and air under pressure into the turbine 41.

The turbine 41 which drives the compressors may be of any selected or required construction. As illustrated in Figure 1, the turbine includes a rotor 42 secured to the shaft 25 and operating within a turbine casing 43. Turbine buckets or blades 44 on the rotor 42 operate between stator blades 45 on the casing 43. The hot combustion gases and air discharging under pressure through the annular nozzle 40 drive the turbine 41. These gases leaving the expansion zone of the turbine, pass through a nozzle 46 in the rear portion of the casing section 11 to be discharged from the power plant in the form of a reactive propulsion jet.

From the foregoing it will be seen that the turbine 41, driven by the hot propulsive gases, serves to directly drive the second stage compressor 22. A speed reduction drive is provided between the second stage compressor 22 and the rotor 15 of the first stage compressor. This drive includes a pair of annular plates 47 and 48 carried by or attached to radial tubular studs 50 secured in openings in the casing at the bolted connection 12. A gear 51 is splined or otherwise connected with the shaft-like forward end of the rotor 23 and is supported by bearing means 52 on the plate 47. The drive further includes a plurality of clusters or pairs of radially positioned pinions 53 and 54. The pinions 53 and 54 of each pair are splined together and are secured with their splined ends in engagement by central screws 62. The inner pinions 53 are supported by bearings 56 on the tubular supporting member 18 and mesh with the drive gear 51. The outer pinions 54 are supported by bearings 57 on the plates 47 and 48 and mesh with a ring gear 58. The gear 58 is supported by bearing means 60 on the plate 48 and is connected with the hub of the rotor plate 16 of the first stage compressor by flexible splines 61. The several pinions and gears of the drive are preferably of the spiral bevel type. From the foregoing, it will be seen how the rotor 15 of the first stage compressor is driven by the rotor 23 of the second stage compressor through the medium of the speed reduction drive.

A turbine power plant of the class herein described requires a number of auxiliaries and/or accessories such as pumps, governors, valves, generators, and the like, and it is usually preferred or necessary to incorporate these devices in the power plant assembly or to mount them on the exterior of the engine. As pointed out above, the present invention provides an especially advantageous location or mounting for the auxiliaries and a simple effective internal drive means for the same. The portion of the casing section 11 around the housing of the second stage compressor and lying between the supporting plate 29 and the combustion chamber 35 is unoccupied and available for the reception of the auxiliaries. In the particular form of the invention disclosed in the drawing, two recesses or pockets 63 are provided in this region to contain the auxiliaries and accessories. These pockets 63 are diametrically opposite and in the construction illustrated are elongated in the transverse or tangential direction. The pockets 63 may be defined or lined by sheets or liners 64 having flanges 65 at their margins welded or otherwise secured to the wall of the casing section 11, the section 11 being provided with openings for the reception of the liners 64. At their forward ends the liners 64 lie adjacent and conform to the supporting plate 29 while the rear walls of the liners extend inwardly from the casing wall at a slight angle. The inner or bottom walls of the liners 64 are generally flat and lie in a plane tangent to a circle slightly smaller in diameter than the compressor housing 26 so that the intermediate portion of these bottom walls are curved to fit around the housing 26 with some clearance. This is best illustrated in Figure 3 of the drawings. The outer sides of the pockets 63 may be left open so that the accessories and auxiliaries are readily accessible.

The invention provides power take-off shafts 66 which extend from the above described speed reducing transmission of the compressor system into the pockets 63. In practice there may be a single shaft 66 arranged to extend into each pocket 63, although as described below, each shaft 66 may carry two or more pinions for driving the auxiliaries. The shafts 66 extend rearwardly and slightly outwardly or radially from adjacent the pinions 54 of two diametrically opposite pairs or clusters of pinions 53 and 54. Suitable tubular housings 67 may enclose and protect the major forward portions of the shafts 66. The shaft housings 67 are engaged or secured in openings 68 in the plate 47 and the housings extend rearwardly through the passage 30 to pass through openings in the direction changing guides 31 and 33, the plalte 29, and liners 64. Bearing brackets 680 are secured to the assembly of the plate 47 and studs 50 and are constructed to straddle the pinions 69. Trunnions or hubs 70 on the ends of the pinions 69 are supported by bearings 71 mounted in the brackets 680. The pinions 69, which are of the skew type, mesh with the pinions 54 to be driven thereby. It will be observed from an inspection of Figure 9 that the axes of rotation of the pinions 69 are pitched radially outward to a slight extent relative to the axes of rotation of the pinions 54. This relationship results from the angular disposition of the shafts 66 which are arranged to pass rearwardly clear of the compressor housing 26. End splines or face splines 710 connect the pinions 69 with the forward ends of their respective shafts 66. The ratio between the pinions 54 and 69 may be such that the shafts 66 are rotated at high speed. For example, where the pinions 54 are rotated at 33,000 R. P. M. the shafts 66 may be driven at a speed of 47,300 R. P. M. It is to be observed that the power take-off shafts 66 are driven directly from the pinions 54 of the speed reducing drive for the first stage compressor without necessitating modification of the speed reducing transmission mechanism and without interfering with the operation of the compressor system.

Each pocket 63 contains or is provided with a gear case 76 which forms a multiple power take-off means. The cases 76 extend axially and centrally through their respective pockets 63 and have flat parallel sides which are generally radial with respect to the central longitudinal axis of the power plant. As illustrated in the drawing, the cases 76 conform to and merge with the bottom and end walls of the recesses or pockets 63. The shafts 66 described above, extend into the cases 76 and are supported therein by space bearing means 74 and 75 on the inner or bottom walls of the cases. Covers or plates 77, preferably circular, close openings in corresponding side walls of the cases 76. Spaced gears 78 are provided in each case 76. In the particular embodiment of the invention illustrated, there are two spaced gears 78 in each case 76. The gears 78 are arranged with their axes of rotation perpendicular to the side walls of the cases 76 and hubs 79 on the sides of the gears are rotatably supported in bearings 80 carried in openings in the side walls and plates 77 of the cases. It will be observed that there are two hubs 79 on each gear 78 and that each of these hubs is accessible, through openings 9 in the walls of the cases 76, for driving auxiliaries, etc. The gear hubs 79 are tubular and are internally splined to receive the splined end portions of the shafts 81 of the auxiliaries A, etc., as shown in Figures 3 and 5.

Where there are two gears 78 in each case 76, four auxiliaries or four sets of auxiliaries may be simultaneously driven from each take-off shaft 66.

The take-off shafts 66 are each provided with two pinions, 82 and 83, for meshing with the gears 78 to drive the auxiliaries. The pinions 82 and 83 are hypoid pinions owing to the inclination or angularity of the shafts 66 and the teeth of the gears 78 being on side surfaces of the gears. This is clearly illustrated in Figures 4, 5 and 6 of the drawings. Further, it will be seen from an inspection of Figure 9 that the two shafts 66, with their respective pinions 63, 82 and 83, are the same and in corresponding positions, the pinions 82 and 83 of one shaft meshing with teeth on the upper sides of their companion gears 78 as viewed in the drawings, and the pinions 82 and 83 of the other shaft meshing with the teeth on the lower side of the related gears 78. The apparent difference in the position of the parts results from the fact that the two shafts 66 and the gearing assemblies are spaced approximately 180° from one another around the longitudinal axis of the power plant. It will be seen that the gears and pinions of the two auxiliary drive assemblies may be identical or duplicates to reduce the costs of manufacture. The pinions 82 and 83 and their companion gears 78 are preferably related to effect a substantial speed reduction. For example, a pinion 82 may have 13 teeth while its companion gear may have 51 teeth. However, since hypoid gears are used, it will be apparent that by varying the number of teeth on the gears 78 and/or their pinions 82 and 83, practically any selected speed ratio may be obtained for the driving of the related auxiliaries without altering the shaft center positions.

Another advantage that may be obtained with the auxiliary drives is the ability to change or select the direction of rotation of the auxiliaries. As best illustrated in Figure 8, the rear ends of the shaft housings 67 are enlarged to carry shaft supporting bearings 90 and the pinions 82 for meshing with the front gears 78 are fixed to the shafts 66 adjacent to these bearings to be ahead of the planes occupied by the axes of rotation of the gears 78. This causes the gears 78 to be rotated in one direction. However, by securing a pinion 82 to its respective shaft 66 in a position to mesh with the companion gear 78 behind the plane occupied by the axis of rotation of the gear, the gear 78 is caused to rotate in the opposite direction. In a like manner, although I have shown the rear pinions 83 meshing with the forward portions of the rear gears 78 adjacent to the bearing means 74 to rotate the gears and their respective auxiliaries in one direction, the pinions 83 may, if required, be secured to their respective shafts 66 adjacent to the bearing means 75 to mesh with the rear portions of the rear gears 78 so as to rotate the gears in the opposite direction. It will be noted that the bearing means 74, 75 and 90 are located to dependably support the shafts 66 and yet allow the pinions 82 and 83 to be optionally positioned as just described. In practice the pinions 82 and 83 may be splined on the shafts 66 in manners to allow easy shifting or adjustment of the pinions as just described and hubs 99 on the pinions may be supported directly in the bearings 74, 75 and 90.

The present invention is not primarily concerned with the details of the accessories or auxiliaries mounted in the pockets 63. In the drawings I have illustrated sets or groups of auxiliaries in each pocket 63 and have applied the character A to each of these devices, it being apparent that the number and character of the auxiliaries may be different in various power plant installations. As previously described, the tubular hubs 79 of the gears 78 are accessible on opposite sides of the gear cases 76 and by arranging the auxiliaries A in the pockets 63 at the sides of the cases 76 and in alignment with the gears 78 the auxiliaries may be readily coupled with the drives. Thus, in the drawings, the auxiliaries A have splined shafts 81 engaged in the internally splined gear hubs 79 so as to be driven by the gears 78. Appropriate mounting pads 92 are provided in the pockets 63 and the auxiliaries A are arranged on the pads in alignment with the gears 78. Studs or screws 93 secure the auxiliaries A to the pads 92. By providing some very slight lateral clearance in the splines of the hubs 79 and shafts 81 and by employing register means 94 on the mounting pads or cases 76 the auxiliaries A may be easily and quickly coupled with their respective gears 87 and then secured in place by simply tightening down the screws 93. In this connection it will be observed that the screws 93 face outwardly or tangentially and have their heads in positions to be conveniently engaged by wrenches or the like. This greatly simplifies the installation and the removal of the auxiliaries A. Telescoping or interfitting parts 94, gaskets, or the like, may be provided on the sides of the auxiliaries A and on the walls of the gear cases 76, adjacent the ends of the hubs 79 to constitute the register means to facilitate alignment of the auxiliaries A with the gears 78. Where required or necessary, seal rings 95 may be arranged between the opposing surfaces of the auxiliaries A and the gear cases 76.

To further facilitate easy installation, servicing and removal of the auxiliaries A, I provide gang plugs or receptacles 96 on the wall of the casing section 11. The gang receptacles 96 are in the nature of multiple junction boxes for receiving and connecting the ends of the various fluid lines and electrical conduits 97 which extend to and from the auxiliaries A. The receptacles 96 are easily accessible at the exterior of the casing section 11 and the internal lines 97 of the power plant extend to their inner sides while the lines 98 that are external of the power plant couple with the outer sides of the receptacles.

From the foregoing, it will be seen that the auxiliaries A are housed in the pockets 63 where they are within the outside dimensions of the power plant and where they are easily accessible for inspection, servicing, etc. There are two similar or like pockets 63 permitting the employment of duplicate active and stand-by sets of auxiliaries. As above described, the auxiliaries may be driven in the proper directions and at the proper speeds by arranging the pinions 82 and 83 in the required positions and by employing suitable ratios in the gear and pinion sets. During operation of the power plant the turbine 41 drives the rotor 23 of the second stage compressor 22 and the first stage compressor is driven through the speed reduction gearing or transmission. The pinions 54 of this transmission cooperate with the gears 69 to drive the shafts 66 which in turn drive the pinions 82 and 83 to rotate the gears 78. In this way the several auxiliaries A are simultaneously driven without in any way interfering with the operation of the compressors or other components of the power plant. The take-off shafts 66 for driving the auxiliaries are entirely within the power plant but are arranged and positioned where they do not obstruct the flow of the compressed air or complicate the internal power plant mechanism. The auxiliaries A being arranged in the pockets 63 are adjacent to the principal elements of the power plant. For example, the fuel pumps are adjacent to the fuel injection nozzles 37 and the coolant pumps are in close relation to the heat exchanger 32. The location of the auxiliaries A in the intermediate region of the power plant obviates the necessity for employing long pipes and conduits and thereby simplifies the overall construction. Another salient feature is that a failure in the auxiliaries A can not cause damage of the power plant proper.

Having described only a typical preferred embodiment of the invention I do not wish to be limited to the specific details set forth, but wish to reserve to myself any features or modifications that may fall within the scope of the following claims.

I claim:

1. In a power plant having a gas turbine and a combustion chamber the combination of a power plant casing enclosing the turbine and combustion chamber and having a forward generally cylindrical portion, a first stage compressor in the forward portion of the casing, the external diameter of the first stage compressor substantially corresponding with the diameter of said portion of the casing, a second stage compressor in the casing between the first stage compressor and the combustion chamber, the second stage compressor being smaller in diameter than said portion of the casing leaving a space within the casing, a power plant auxiliary in said space, a drive between the turbine and second stage compressor whereby the second stage compressor is driven by the turbine, a gear drive between the first and second stage compressors, and a drive between said gear drive and the auxiliary for driving the latter.

2. In a power plant having a gas turbine and a combustion chamber the combination of a power plant casing enclosing the turbine and combustion chamber and having a forward generally cylindrical portion, a first stage compressor in the forward portion of the casing, a second stage compressor in the casing between the first stage compressor and the combustion chamber, the second stage compressor being smaller in diameter than said portion of the casing leaving a space, a case in said space, a gear in the case having at least one hub accessible from the exterior of the case, a power plant auxiliary in said space coupled with said hub to be driven by the gear, a shaft extending axially through the casing, a pinion on the shaft meshing with said gear, a drive between the turbine and the second stage compressor, a gear drive between the first and second stage compressors, and a pinion on said shaft meshing with a gear of said gear drive whereby the auxiliary is driven.

3. In a power plant having a gas turbine, the combination of first and second stage compressors, a casing for the turbine and compressors, the second stage compressor being of smaller outside diameter than the first stage compressor and the casing leaving a space in the casing, a plurality of gears rotatably supported in said space, means on the ends of said gears for connecting with power plant auxiliaries to drive the same, means in said space for supporting such auxiliaries, a drive between the turbine and the second stage compressor, a gear drive between the first and second stage compressors, a shaft driven by said gear drive and extending axially in the casing to said space, and pinions on the shaft driving said gears.

4. In a power plant having a gas turbine, the combination of first and second stage compressors, a casing for the turbine and compressors, the second stage compressor being of smaller diameter than the first stage compressor and casing leaving a space in the casing, diametrically opposite pockets in said space, a drive between the turbine and the second stage compressor, a speed reducing drive between the compressors comprising gears associated with the compressors and radially disposed sets of pinions meshing with the gears, shafts extending axially in the casing from the pockets to the speed reducing drive, pinions fixed to the shafts and meshing with certain of the first named pinions and means in the pockets for mounting power plant auxiliaries therein to be driven by said shafts.

5. In a power plant having a gas turbine, the combination of first and second stage compressors, a casing for the turbine and compressors, the second stage compressor being of smaller diameter than the first stage compressor and casing leaving a space in the casing, diametrically opposite pockets in said space, a drive between the turbine and the second stage compressor, a speed reducing drive between the compressors comprising gears associated with the compressors and radially disposed sets of pinions meshing with the gears, shafts extending axially in the casing from the pockets to the speed reducing drive, pinions fixed to the shafts and meshing with certain of the first named pinions so that the shafts are driven from the speed reducing drive, spaced gears rotatably supported in each pocket and each provided at each of its ends with an accessible hub, power plant auxiliaries connected with at least some of said gear hubs to be driven thereby, and pinions fixed on said shafts and meshing with said gears to drive the same.

6. In a turbo power plant having a gas turbine and at least one auxiliary the combination of, a power plant casing containing the turbine and having an external pocket receiving the auxiliary, a radial shaft in the casing, bevel gear means driven by the turbine for driving the radial shaft, an axially extending shaft in the casing, skew gear means operatively connecting the radial shaft and the axial shaft, a tangential shaft for driving the auxiliary, and a hypoid gear drive between the axial shaft and the tangential shaft.

NATHAN C. PRICE.

References Cited in the file of this patent

UNITED STATES PATENTS

| Number | Name | Date |
|---|---|---|
| 2,396,911 | Anxionnaz | Mar. 19, 1946 |
| 2,443,250 | Johnson | June 15, 1948 |
| 2,476,218 | Prime | July 12, 1949 |
| 2,479,573 | Howard | Aug. 23, 1949 |

FOREIGN PATENTS

| Number | Country | Date |
|---|---|---|
| 588,096 | Great Britain | Mar. 14, 1947 |

OTHER REFERENCES

Flight Magazine, February 6, 1947, pp. 142–145; 142A, 142B.

Flight Magazine, March 18, 1948, pages d and e (middle of book).